Sept. 30, 1958　　　G. G. SCARROTT　　　2,854,581
BEAT FREQUENCY OSCILLATOR
Filed Nov. 7, 1956
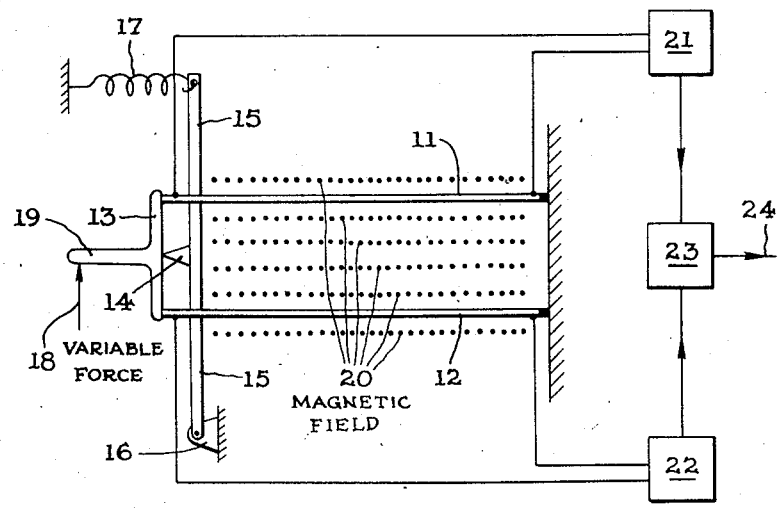
INVENTOR
GORDON GEORGE SCARROTT
BY *Cameron, Kerkam & Sutton*
ATTORNEY United States Patent Office 2,854,581
Patented Sept. 30, 1958

2,854,581

BEAT FREQUENCY OSCILLATOR

Gordon G. Scarrott, Manchester, England, assignor to Ferranti, Limited, Hollinwood, Lancashire, England, a British company Application November 7, 1956, Serial No. 620,952

Claims priority, application Great Britain November 11, 1955

3 Claims. (Cl. 250—36)

This invention relates to beat frequency oscillators for supplying an electrical signal having a frequency proportional to an applied variable mechanical force.

The value of the force may conveniently be ascertained from the signal by means of some sort of counter stage arranged to count the number of cycles of the signal which occur during a predetermined time interval.

The force concerned may be derived from a pressure capsule, and thereby indicate the pressure of a fluid; or it may be derived from a bimetal strip, and thereby indicate temperature. Other applications of the invention will be readily apparent.

An object of the present invention is to provide a beat frequency oscillator for the purpose stated of simple construction but accurate performance.

In accordance with the present invention, a beat frequency oscillator for supplying an electrical signal having a frequency proportional to an applied variable mechanical force comprises two flexible longitudinal conductors of equal mass per unit length mounted to allow of transverse vibration over substantially equal lengths (as hereinafter defined), means for maintaining them in longitudinal tension, driving means for maintain them in transverse vibration, means for differentially adjusting the values of said longitudinal tension of the conductors—increasing that of one conductor and simultaneously decreasing that of the other conductor by an equal amount—in linear dependence on said force, and output means for deriving as said signal a signal having a frequency equal to the difference between the frequencies of vibration of said conductors.

By "substantially equal lengths" is meant that the lengths are equal except for such inappreciable departures from inequality as result from the differential tensions of the conductors.

Said driving means may comprise for each conductor a magnetic field transverse to the direction of vibration of the conductor and an electrical circuit of effective negative resistance which includes the conductor; in which case said output means may include a mixer stage for deriving a voltage at the difference frequency of the currents in said circuits.

The accompanying drawing shows, in part in elevation and in part schematically, an embodiment of the invention.

In carrying out the invention in accordance with one form by way of example, a beat frequency oscillator for supplying an electrical signal having a frequency proportional to an applied variable mechanical force consists of two flexible longitudinal conductors 11 and 12 (see the accompanying drawing) of equal mass per unit length and of equal length when not in tension. The conductors are made of some strong non-magnetic corrosion-resisting material which is also a sufficiently good electrical conductor, for example, beryllium copper. They are in the form of very thin strips (shown in the drawing edge-on, with the thickness exaggerated) and are disposed parallel with one another with one end of each (the right-hand end, as depicted) fixed and electrically insulated. The other ends are secured to the respective ends of a first-order lever 13 having a central fulcrum on a knife-edge bearing 14 carried at some intermediate position on another lever 15. One end of lever 15 is pivoted at 16 to a fixed support; the other end is urged by a strong tension spring 17 in the direction appropriate to maintaining conductors 11 and 12 in longitudinal tension. The variable force, indicated by the arrow 18, is applied to lever 13 by way of an arm 19 which extends from lever 13 in a direction such that the force tends to rotate lever 13 about the knife-edge 14.

The conductors are located in a fixed field 20, the direction of which is transverse—conveniently, normal— to the direction in which the conductors are intended to vibrate. As the latter direction is normal to the planes of the strips, the field is depicted as normal to the plane of the paper. The distribution of the field along the length of each conductor is preferably sinusoidal. The ends of conductor 11 are electrically connected to a stage 21 such that it includes with the conductor a circuit of effective negative resistance. A valve stage which includes the conductor in the input circuit and is arranged for positive feedback is a suitable device. The ends of conductor 12 are similarly connected to a like stage 22. Stages 21 and 22 are connected to a mixer stage 23 designed to supply over an output lead 24 a voltage at the difference frequency of currents flowing in conductors 11 and 12.

In operation, the combination of the magnetic field and the negative-resistance circuits maintains conductors 11 and 12 in transverse resonant vibration in the direction referred to, that is, normal to the planes of the strips, at a frequency in each case which at any given moment is solely dependent on the vibrating length of the conductor, its mass per unit length, and the tension to which it is subjected at that moment. Each negative-resistance circuit acts as an oscillator, the frequency of the resulting current being equal to the frequency at which the conductor is vibrating.

The tension to which each conductor is subjected is determined by spring 17 and force 18. The arrangement is such that when force 18 is zero, spring 17 subjects both conductors to the same tension. As the vibrating lengths are equal, each of the three factors, above mentioned, which determine the resonant frequency of vibration of one of the conductors is equal to the corresponding factor for the other conductor. The two conductors therefore vibrate at the same frequency, and the respective oscillatory currents are also of the same frequency. The frequency of the output signal over lead 24 is therefore zero.

When the force 18 has other than zero value, it clearly increases the tension in conductor 12—assuming it acts in the direction of the arrow—but decreases that of conductor 11 by an equal amount. As these tensions are now unequal the frequencies of vibration are no longer equal. It can be shown that to a close approximation the difference between these frequencies is directly proportional to the value of force 18. The signal voltage derived from mixer stage 23 over lead 24 thus has a frequency proportional to force 18, as was required.

It will be appreciated that whenever force 18 has a value other than zero, the two conductors are stressed differently from one another and therefore depart slightly from exact equality of length. The departure is, however, sufficiently slight to be neglected and the two conductors remain of substantially equal lengths, as above defined.

It will also be appreciated that spring 17 must be strong enough relative to the force 18 to maintain in tension that one of the conductors the tension of which is decreased by the action of force 18.

As already stated, the force 18 may be derived from a pressure capsule, and so indicate the pressure of a fluid, or from a bimetal strip, and so indicate temperature. The force may of course be derived in numerous other ways, depending on the nature of the quantity to be measured.

The signal derived over lead 24 may be applied through a timing device to a counter stage whereby a measurement of the frequency is derived from a count of the number of cycles that occur in a predetermined interval delimited by the timing device.

What we claim is:

1. A beat frequency oscillator for supplying an electrical signal having a frequency proportional to an applied variable mechanical force comprising two flexible longitudinal conductors of equal mass per unit length mounted to allow of transverse vibration over substantially equal lengths, means for maintaining said conductors in longitudinal tension, driving means for maintaining said conductors in transverse vibration, means for differentially adjusting the values of said longitudinal tension of the conductors—increasing that of one conductor and simultaneously decreasing that of the other conductor by an equal amount—in linear dependence on said force, and output means for deriving as said signal a signal having a frequency equal to the difference between the frequencies of vibration of said conductors.

2. A beat frequency oscillator as claimed in claim 1 wherein said driving means comprises for each conductor a magnetic field transverse to the direction of vibration of the conductor and an electrical circuit of effective negative resistance which includes the conductor.

3. A beat frequency oscillator as claimed in claim 2 wherein said output means includes a mixer stage for deriving a voltage at the difference frequency of the currents in said circuits.

References Cited in the file of this patent

UNITED STATES PATENTS

| | | |
|---|---|---|
| 1,841,489 | Marrison | Jan. 19, 1932 |
| 2,110,082 | Granger | Mar. 1, 1938 |
| 2,265,011 | Siegel | Dec. 2, 1941 |
| 2,472,249 | De Giess et al. | June 7, 1949 |